(12) United States Patent
Miyawaki et al.

(10) Patent No.: US 11,679,446 B2
(45) Date of Patent: Jun. 20, 2023

(54) FRICTION STIR WELDING APPARATUS

(71) Applicant: HONDA MOTOR CO., LTD., Tokyo (JP)

(72) Inventors: Akiyoshi Miyawaki, Wako (JP); Mitsuru Sayama, Wako (JP); Taichi Kurihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/336,374

(22) Filed: Jun. 2, 2021

(65) Prior Publication Data

US 2021/0379691 A1    Dec. 9, 2021

(30) Foreign Application Priority Data

Jun. 4, 2020 (JP) ............................ JP2020-097656

(51) Int. Cl.
  *B23K 20/00* (2006.01)
  *B23K 20/12* (2006.01)

(52) U.S. Cl.
  CPC ............................. *B23K 20/1255* (2013.01)

(58) Field of Classification Search
  CPC ............. B23K 20/1255; B23K 20/125; B23K 20/1265; B23K 20/00; B23K 20/12; B23K 20/122; B23K 20/123; B23K 20/126; B23K 20/127; B23K 20/129; B23K 20/227; B23K 20/24; B23K 2101/38; B23K 2103/04; B23K 2103/10; F16B 35/005
  See application file for complete search history.

(56) References Cited

U.S. PATENT DOCUMENTS

| | | | | |
|---|---|---|---|---|
| 1,753,154 | A * | 4/1930 | Martus | F16B 35/005 411/395 |
| 8,840,347 | B2 * | 9/2014 | Aare | B23B 51/02 408/232 |
| 9,937,586 | B2 * | 4/2018 | Weigl | B23K 20/1245 |
| 10,022,817 | B2 * | 7/2018 | Maruko | B23K 20/1255 |
| 10,799,980 | B2 * | 10/2020 | Packer | B23K 20/1255 |
| 11,305,375 | B2 * | 4/2022 | Landmark | B23K 20/125 |
| 11,331,747 | B1 * | 5/2022 | Cobb | B23K 20/1255 |

(Continued)

FOREIGN PATENT DOCUMENTS

| | | |
|---|---|---|
| CN | 1768224 | 5/2006 |
| CN | 101472723 | 7/2009 |

(Continued)

OTHER PUBLICATIONS

Chinese Office Action for Chinese Patent Application No. 202110581658.6 dated Sep. 16, 2022.

*Primary Examiner* — Erin B Saad
(74) *Attorney, Agent, or Firm* — Amin, Turocy & Watson, LLP

(57) ABSTRACT

A friction stir welding apparatus includes a probe, a shoulder, a recess part, and an annular member. The probe is pressed to a joint part of a plurality of joined members while being rotated. The shoulder is formed so as to surround the probe at an outside in a radial direction with respect to a rotation axis of the probe. The recess part is formed on at least one of an outer circumference of the probe and an inner circumference of the shoulder. The annular member is fitted to the recess part.

5 Claims, 8 Drawing Sheets

(56) References Cited

U.S. PATENT DOCUMENTS

| | | | | |
|---|---|---|---|---|
| 2003/0098335 A1* | 5/2003 | Saeki | ............... | B23K 20/1255 |
| | | | | 228/2.1 |
| 2006/0055119 A1 | 3/2006 | Hatori | | |
| 2006/0169741 A1* | 8/2006 | Smith | ............... | B23K 20/126 |
| | | | | 228/2.1 |
| 2006/0169747 A1* | 8/2006 | Tolle | ................ | B23K 20/227 |
| | | | | 228/112.1 |
| 2009/0095795 A1* | 4/2009 | Hunt | ................ | B23K 20/1255 |
| | | | | 228/2.1 |
| 2009/0226789 A1* | 9/2009 | Mizusaki | ........... | H01M 8/2465 |
| | | | | 429/454 |
| 2012/0093602 A1* | 4/2012 | Osawa | ................. | B23C 5/10 |
| | | | | 408/239 R |
| 2014/0217151 A1* | 8/2014 | Miyahara | ............. | B23B 31/11 |
| | | | | 228/2.1 |
| 2016/0008918 A1* | 1/2016 | Burford | ............ | B23K 20/1255 |
| | | | | 228/2.1 |
| 2016/0354860 A1 | 12/2016 | Boettcher et al. | | |
| 2020/0338664 A1* | 10/2020 | Hachiya | ............ | B23K 20/1255 |
| 2021/0008658 A1* | 1/2021 | Frank | ................ | B23K 20/00 |
| 2021/0121977 A1* | 4/2021 | Rosal | ................ | B23K 20/1255 |
| 2021/0402508 A1* | 12/2021 | Miyawaki | ........ | B23K 20/1255 |

FOREIGN PATENT DOCUMENTS

| | | |
|---|---|---|
| CN | 104067034 | 9/2014 |
| CN | 109202266 | 1/2019 |
| CN | 110280886 | 9/2019 |
| CN | 209354662 | 9/2019 |
| JP | 2006-000858 | 1/2006 |
| JP | 2013-121606 | 6/2013 |
| JP | 2014-138957 | 7/2014 |

\* cited by examiner

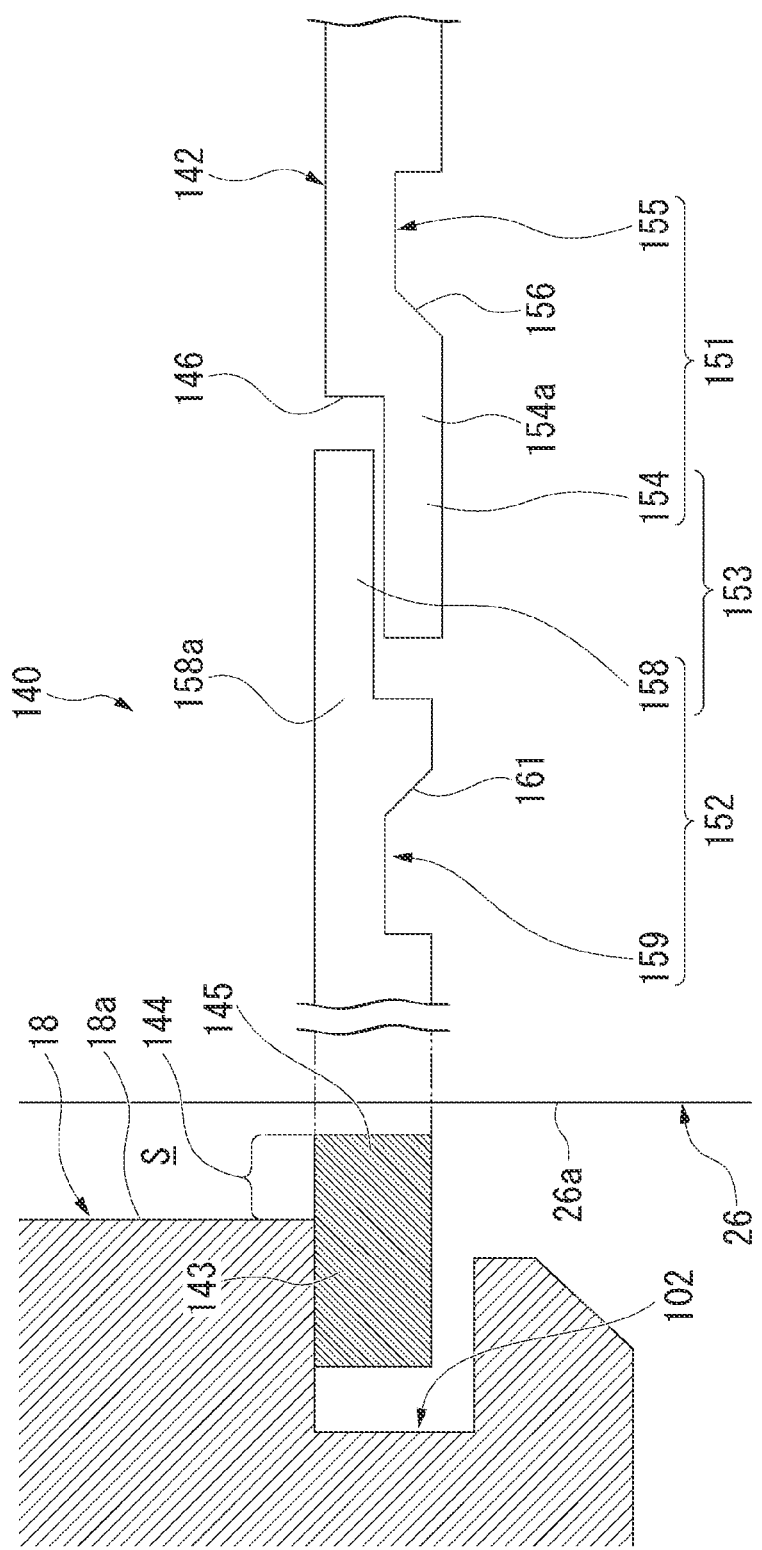

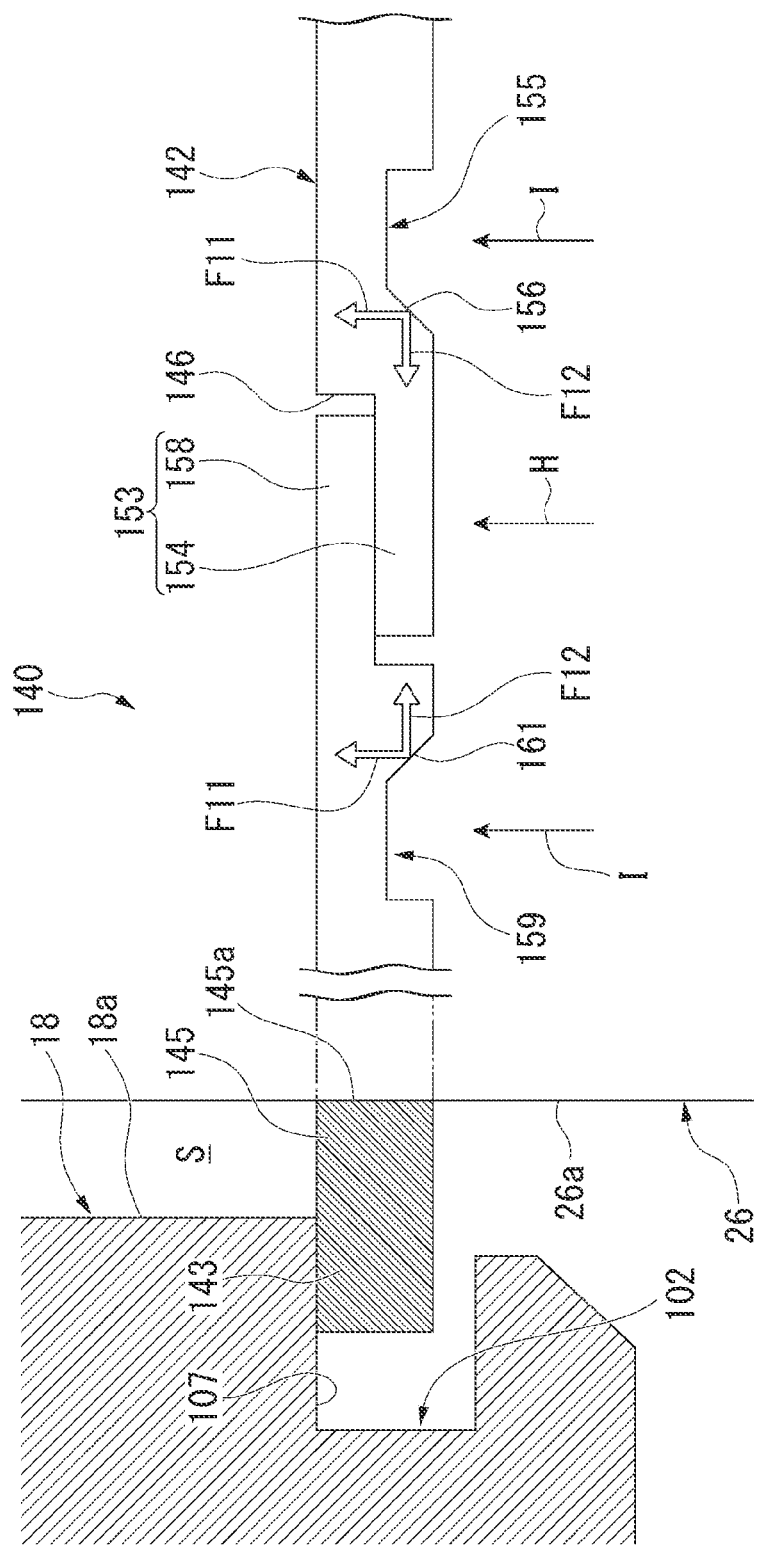

FRICTION STIR WELDING APPARATUS

CROSS-REFERENCE TO RELATED APPLICATION

Priority is claimed on Japanese Patent Application No. 2020-097656, filed on Jun. 4, 2020, the contents of which are incorporated herein by reference.

BACKGROUND

Field of the Invention

The present invention relates to a friction stir welding apparatus.

Background

As a friction stir welding apparatus, for example, a configuration is known in which by rotating and moving a tool (hereinafter, referred to as a probe) on a joined member, the joined member is welded by friction heat generated between the probe and the joined member. In this configuration, for example, a groove part is formed along a rotation axis direction on an outer circumferential surface of the probe, and the probe is connected to a sleeve (hereinafter, referred to as a shoulder) via a ball fitted to the groove part. Accordingly, the rotation of the shoulder is transmitted to the probe via the ball, and the probe rotates. The ball is slid while rotating the shoulder and the probe, and the probe is moved in the axis direction of the rotation axis. According to this configuration, the probe is stably held by the shoulder (for example, refer to Japanese Unexamined Patent Application, First Publication No. 2013-121606).

As a friction stir welding apparatus configuration, for example, a configuration is known in which a groove part is formed along a rotation axis direction of a surface of a probe, and the probe is connected to a shoulder via a guide bar fitted to the groove part. Accordingly, the rotation of the probe is transmitted to the shoulder via the guide bar, and the shoulder rotates. The guide bar is slid while rotating the probe and the shoulder, and the probe is moved in the axis direction of the rotation axis. According to this configuration, the probe is stably held by the shoulder (for example, refer to Japanese Unexamined Patent Application, First Publication No. 2006-858).

SUMMARY

However, in the friction stir welding apparatuses of Japanese Unexamined Patent Application, First Publication No. 2013-121606 and Japanese Unexamined Patent Application, First Publication No. 2006-858, a clearance (gap) is formed between the probe and the shoulder. Therefore, it is conceivable that a cutting chip (for example, a burr or the like) that is generated when the joined member is welded by friction heat enters the gap between the probe and the shoulder, and thereby, the quality of the joint part of the joined member is affected.

An aspect of the present invention is intended to provide a friction stir welding apparatus capable of preventing a cutting chip that is generated at the time of friction stir welding of a joined member from entering a gap between a probe and a shoulder.

A friction stir welding apparatus according to a first aspect of the present invention includes: a probe that is pressed to a joint part of a plurality of joined members while being rotated; a shoulder that surrounds the probe at an outside in a radial direction with respect to a rotation axis of the probe; a recess part that is formed on at least one of an outer circumference of the probe and an inner circumference of the shoulder; and an annular member that is fitted to the recess part.

According to this configuration, the shoulder is formed so as to surround the probe at the outside in the radial direction with respect to the rotation axis of the probe. Thereby, for example, in a state where the probe is rotated around the rotation axis, the probe can be stably held by the shoulder.

Further, the recess part is formed on at least one of the outer circumference of the probe and the inner circumference of the shoulder, and the annular member is fitted to the recess part. Accordingly, the outside part of the annular member can protrude from the recess part, and the gap between the probe and the shoulder can be blocked by the annular member. Thereby, it is possible to prevent a cutting chip (for example, a burr or the like) that is generated at the time of friction stir welding of the joined member from entering the gap between the probe and the shoulder by the annular member. Accordingly, it is possible to improve the quality of the joint part at which the plurality of joined members are joined together by the friction stir welding using the probe.

Further, by fitting the annular member to the recess part, heat transmitted to the probe at the time of the friction stir welding can be transmitted (escape) to the shoulder via the annular member. Thereby, a heat-reducing effect of the probe can be expected.

A second aspect of the present invention is the friction stir welding apparatus according to the first aspect described above, wherein the recess part may be formed on the probe such that at least a portion of an inner circumferential end part of the annular member enters the recess part, and the inner circumferential end part may have an inner taper portion inclined so as to approach the joint part with advancement from an inside to an outside of the radial direction.

Accordingly, the cutting chip that is generated at the time of friction stir welding of the joined member can enter the recess part and cause a pushing force by the cutting chip to act on the inner taper portion. The pushing force by the cutting chip is divided at the inner taper portion into a first component force that pushes the inner circumferential end part toward the opposite side of the joint part and a second component force that pushes the inner circumferential end part toward the outside in the radial direction.

By the first component force, it is possible to cause the inner circumferential end part of the annular member to come into close contact with the recess part (that is, the probe). By the second component force, it is possible to cause the outer circumferential end part of the annular member to come into close contact with the shoulder. Here, in addition to the second component force, a force toward the outside in the radial direction due to a centrifugal force of the cutting chip that has entered the recess part acts on the inner taper portion. Accordingly, the contact property to the shoulder by the outer circumferential end part of the annular member is enhanced. Thereby, the gap between the probe and the shoulder can be blocked (filled) by the annular member, and it is possible to further favorably prevent the cutting chip from entering the gap between the probe and the shoulder by the annular member.

Further, by causing the annular member to come into close contact with the probe and the shoulder, it is possible to efficiently transmit the heat of the probe to the shoulder via the annular member at the time of friction stir welding. Thereby, it is possible to improve the heat-reducing effect of the probe by the annular member.

A third aspect of the present invention is the friction stir welding apparatus according to the first or second aspect described above, wherein the recess part may be formed on the probe such that at least a portion of an inner circumferential end part of the annular member enters the recess part, an outer circumferential end part of the annular member may have a protrusion section that protrudes toward the joint part, and the protrusion section may have an outer taper portion inclined so as to approach the joint part with advancement from an inside to an outside of the radial direction.

Accordingly, the cutting chip that is generated at the time of friction stir welding of the joined member can be guided to the inside (that is, the inner circumferential end part of the annular member) in the radial direction by the outer taper portion. Thereby, it is possible to cause a pushing force by the cutting chip to efficiently act on the inner taper portion of the inner circumferential end part. The pushing force by the cutting chip is divided at the inner taper portion into a first component force that pushes the inner circumferential end part toward an opposite side of the joint part and a second component force that pushes the inner circumferential end part radially outward.

By the first component force, it is possible to cause the inner circumferential end part of the annular member to efficiently come into close contact with the recess part (that is, the probe). By the second component force, it is possible to cause the outer circumferential end part of the annular member to efficiently come into close contact with the shoulder. Thereby, the gap between the probe and the shoulder can be blocked (filled) by the annular member, and it is possible to further favorably and efficiently prevent the cutting chip from entering the gap between the probe and the shoulder by the annular member.

Further, by causing the annular member to efficiently come into close contact with the probe and the shoulder, it is possible to further efficiently transmit the heat of the probe to the shoulder via the annular member at the time of friction stir welding. Thereby, it is possible to further improve the heat-reducing effect of the probe by the annular member.

A fourth aspect of the present invention is the friction stir welding apparatus according to any one of the first to third aspects described above, wherein the recess part may be formed on the probe, the annular member may have a pair of end parts that face each other in a circumferential direction of the rotation axis, the pair of end parts may have an overlapping part that extends along the circumferential direction and that overlaps in an axis direction of the rotation axis, one of the pair of end parts may have: a first joint portion that forms a portion of the overlapping part on a side of the joint part in the axis direction; and a first surface portion that is formed on an end in the circumferential direction of the first joint portion, another of the pair of end parts may have: a second joint portion that forms a portion of the overlapping part on an opposite side of the joint part in the axis direction; and a second surface portion that faces the first surface portion in the circumferential direction, and at least one of the first surface portion and the second surface portion may be inclined such that a spacing between the surface portions is enlarged in the circumferential direction with advancement to the joint part.

According to this configuration, the recess part is formed on the probe, and the annular member is fitted to the recess part. Accordingly, the outside part of the annular member protrudes radially outward from the recess part and is arranged in the gap between the probe and the shoulder. The annular part has the overlapping part at which the first joint portion and the second joint portion overlap in the axis direction. The first joint portion is arranged on the side of the joint part in the axis direction of the overlapping part.

Accordingly, the cutting chip that is generated at the time of the friction stir welding of the joined member can enter the first joint portion and cause a pushing force that pushes toward the opposite side of the joint part to act on the first joint portion. Thereby, by pressing the first joint portion to the second joint portion, it is possible to tighten the overlapping part. Further, by the pushing force of the cutting chip, it is possible to cause the annular member to come into close contact with the recess part (that is, the probe).

Further, at least one of the first surface portion and the second surface portion of the pair of end parts is inclined such that the spacing between the surface portions is enlarged in the circumferential direction with advancement to the joint part.

Accordingly, the cutting chip that is generated at the time of the friction stir welding of the joined member can enter the surface portion having an inclined form and cause a pushing force by the cutting chip to act on the surface portion having an inclined form. The pushing force by the cutting chip is divided at the surface portion having an inclined form into a first component force that pushes toward the opposite side of the joint part and a second component force that pushes so as to enlarge the spacing between the first surface portion and the second surface portion. That is, by the second component force, it is possible to enlarge the diameter of the annular member and cause the annular member to come into close contact with the shoulder.

In this way, by the pushing force of the cutting chip, it is possible to tighten the overlapping part and to cause the annular member to come into close contact with the recess part (that is, the probe). Additionally, by the second component force, it is possible to enlarge the diameter of the annular member and cause the annular member to come into close contact with the shoulder. Thereby, the gap between the probe and the shoulder can be blocked (filled) by the annular member, and it is possible to prevent the cutting chip from entering the gap between the probe and the shoulder by the annular member.

Further, by causing the annular member to come into close contact with the probe and the shoulder, it is possible to efficiently transmit the heat of the probe to the shoulder via the annular member at the time of friction stir welding. Thereby, it is possible to improve the heat-reducing effect of the probe by the annular member.

Here, for example, when the first surface portion of the pair of end parts is inclined, it is possible to push the first surface portion by the first component force toward the opposite side of the joint part. Accordingly, the first joint portion can be pressed to the second joint portion by the first component force, and it is possible to further reliably tighten the overlapping part. Thereby, it is possible to further reliably prevent the cutting chip from entering the gap between the probe and the shoulder by the annular member.

A fifth aspect of the present invention is the friction stir welding apparatus according to the first aspect described above, wherein the recess part may be formed on the shoulder such that at least a portion of an outer circumferential end part of the annular member enters the recess part, and the outer circumferential end part may have an outer taper portion inclined toward the joint part with advancement from an outside to an inside of the radial direction.

According to this configuration, the outer circumferential end part of the annular member enters the recess part, and the outer circumferential end part has the outer taper portion. The outer taper portion is formed to be inclined toward the joint part with advancement from the outside to the inside of the radial direction.

Accordingly, the cutting chip that is generated at the time of welding of the joined member can enter the recess part and cause a pushing force by the cutting chip to act on the outer taper portion. The pushing force by the cutting chip is divided at the outer taper portion into a first component force that pushes the outer circumferential end part toward an opposite side of the joint part and a second component force that pushes the outer circumferential end part radially outward.

By the first component force, it is possible to cause the outer circumferential end part of the annular member to come into close contact with the recess part (that is, the shoulder). By the second component force, it is possible to cause the inner circumferential end part of the annular member to come into close contact with the probe. Thereby, the gap between the shoulder and the probe can be blocked (filled) by the annular member, and it is possible to prevent the cutting chip from entering the gap between the shoulder and the probe by the annular member.

Further, by causing the annular member to come into close contact with the probe and the shoulder, it is possible to efficiently transmit the heat of the probe to the shoulder via the annular member at the time of friction stir welding. Thereby, it is possible to improve the heat-reducing effect of the probe by the annular member.

A sixth aspect of the present invention is the friction stir welding apparatus according to the first or fifth aspect described above, wherein the recess part may be formed on the shoulder such that at least a portion of an outer circumferential end part of the annular member enters the recess part, an inner circumferential end part of the annular member may have a protrusion section that protrudes toward the joint part, and the protrusion section may have an inner taper portion inclined toward the joint part with advancement from an outside to an inside of the radial direction.

According to this configuration, the inner circumferential end part of the annular member has the protrusion section, and the protrusion section has the inner taper portion.

The inner taper portion is formed to be inclined toward the joint part with advancement from the outside to the inside of the radial direction.

Accordingly, the cutting chip that is generated at the time of welding of the joined member can be guided to a radially outer side (that is, the outer circumferential end part of the annular member) by the inner taper portion. Thereby, it is possible to cause a pushing force by the cutting chip to efficiently act on the outer taper portion of the outer circumferential end part.

The pushing force by the cutting chip is divided at the outer taper portion into a first component force that pushes the outer circumferential end part toward an opposite side of the joint part and a second component force that pushes the outer circumferential end part radially inward.

By the first component force, it is possible to cause the outer circumferential end part of the annular member to come into close contact with the recess part (that is, the shoulder). By the second component force, it is possible to cause the inner circumferential end part of the annular member to come into close contact with the probe. Thereby, the gap between the probe and the shoulder can be blocked (filled) by the annular member, and it is possible to prevent the cutting chip from entering the gap between the probe and the shoulder by the annular member.

Further, by causing the annular member to come into close contact with the shoulder and the probe, it is possible to efficiently transmit the heat of the probe to the shoulder via the annular member at the time of friction stir welding. Thereby, it is possible to further improve the heat-reducing effect of the probe by the annular member.

According to an aspect of the present invention, it is possible to prevent a cutting chip that is generated at the time of friction stir welding of the joined member from entering the gap between the probe and the shoulder.

BRIEF DESCRIPTION OF THE DRAWINGS

FIG. 11 is a cross-sectional view showing a friction stir welding apparatus that includes an annular member of a fourth embodiment.

FIG. 12 is a cross-sectional view showing an example of performing a friction stir welding using the friction stir welding apparatus of the fourth embodiment.

DESCRIPTION OF EMBODIMENTS

Hereinafter, a friction stir welding apparatus (FSW: Friction Stir Welding) of an embodiment of the present invention will be described with reference to the drawings.

First Embodiment

Figure 1:
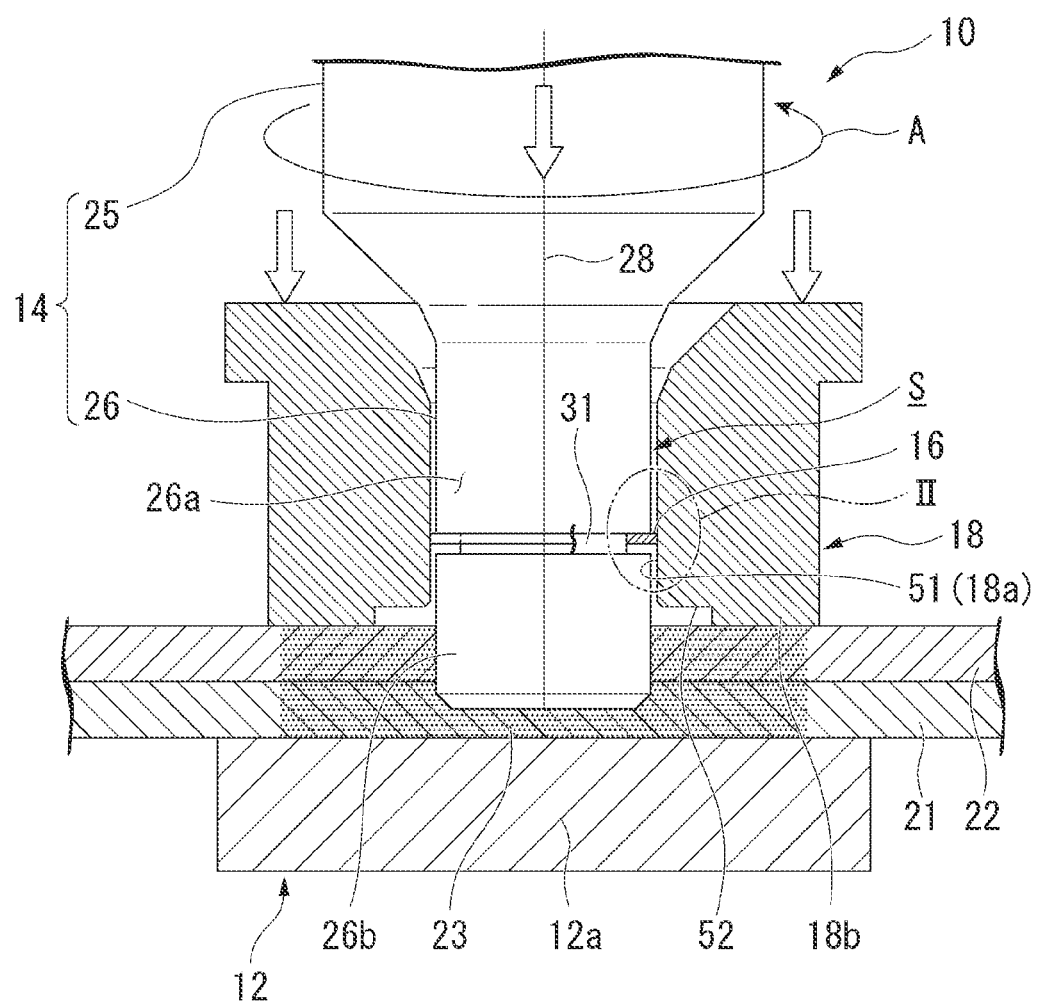
FIG. 1 is a cross-sectional view showing a friction stir welding apparatus of a first embodiment according to the present invention.

As shown in FIG. 1, a friction stir welding apparatus 10 includes a support tool 12, a friction stir welding tool 14, an annular member 16, a shoulder 18, and a drive mechanism (not shown).

A first workpiece (joined member) 21 and a second workpiece (joined member) 22 are arranged (mounted) on the support tool 12 in a stacked state. A recess part (not shown) having a hollow cylindrical shape may be provided on a center part (that is, a portion that corresponds to a probe 26 described later) 12*a* of the support tool 12 of a surface on which the first workpiece 21 is arranged.

For example, a so-called 5000-system aluminum alloy having a JIS symbol number of 5000 to 5999 is used as the first workpiece 21 and the second workpiece 22.

The first workpiece 21 and the second workpiece 22 are welded at a joint part 23 by the friction stir welding tool 14 in a laminated state on the support tool 12.

The first embodiment is described using an example in which two sheets of the first workpiece 21 and the second workpiece 22 are laminated, and the joint part 23 is welded by the friction stir welding; however, for example, three or more workpieces may be laminated, and the joint part may be welded by the friction stir welding. The first embodiment is described using an example in which two sheets of the first workpiece 21 and the second workpiece 22 are laminated, and the friction stir welding is performed; however, the friction stir welding may be performed in a state where the first workpiece 21 and the second workpiece 22 are butted to each other.

Further, the first embodiment is described using an example in which the friction stir welding apparatus 10 is provided as a fixed type; however, the embodiment is not limited thereto. For example, the friction stir welding apparatus 10 may be provided on an arm of a multi-axis robot disposed in a production line or the like.

The friction stir welding tool 14 includes a shaft part 25 and the probe 26. The shaft part 25 is formed in a cylindrical shape and is connected to a drive mechanism (not shown). The probe 26 is provided on a front end of the shaft part 25 on the joint part 23 side coaxially with respect to a rotation axis 28 of the shaft part 25.

The probe 26 is formed in a cylindrical shape having a diameter which is smaller than that of the shaft part 25. The probe 26 is formed of, for example, steel, stainless steel, aluminum alloy, copper alloy, nickel alloy, tungsten alloy, cobalt alloy, titanium alloy, carbide alloy, ceramic, heat resistant resin, or the like.

Hereinafter, an axis direction relative to the rotation axis 28 may simply be abbreviated as an "axis direction". A radial direction relative to the rotation axis 28 of the probe 26 may simply be abbreviated as a "radial direction", and a circumferential direction relative to the rotation axis 28 of the probe 26 may simply be abbreviated as a "circumferential direction".

Figure 2:
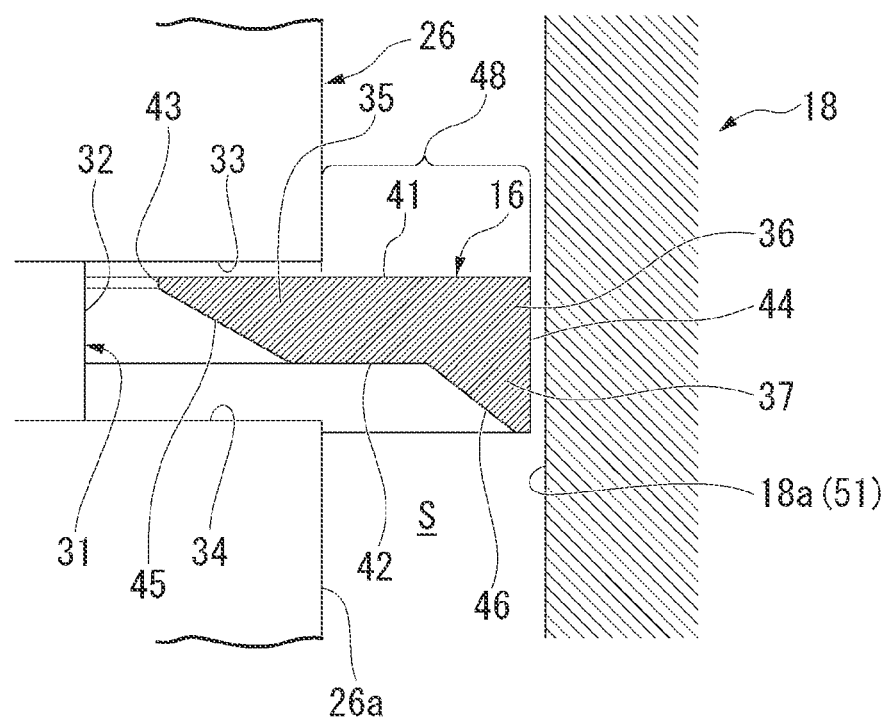
FIG. 2 is an enlarged cross-sectional view of a portion II of FIG. 1.

As shown in FIG. 1 and FIG. 2, a groove part (recess part) 31 is formed at an outer circumferential surface (outer circumference) 26*a* on the probe 26. The groove part 31 is formed in a recess part having an annular shape along a circumferential direction of the probe 26 at substantially the middle in an axis direction of the probe 26. The groove part 31 may be formed at an arbitrary position in the axis direction of an inner circumferential surface 18*a* of the shoulder 18.

Specifically, the groove part 31 includes a groove bottom surface 32, a first groove side surface 33, and a second groove side surface 34. The groove bottom surface 32 is formed on a circumference along the outer circumferential surface 26*a* at a predetermined distance on an inside in a radial direction with respect to the outer circumferential surface 26*a* of the probe 26. The first groove side surface 33 is formed in a ring shape toward an outside in the radial direction to the outer circumferential surface 26*a* from the periphery of an opposite side (a side away from the joint part 23) of the joint part 23 (that is, the first workpiece 21, the second workpiece 22) in the axis direction of the groove bottom surface 32. The second groove side surface 34 is formed in a ring shape toward an outside in the radial direction to the outer circumferential surface 26*a* from the periphery of the joint part 23 side (a side close to the joint part 23) in the axis direction of the groove bottom surface 32.

The first groove side surface 33 and the second groove side surface 34 are formed to face each other at a predetermined interval in the axis direction. That is, the groove part 31 is formed of the groove bottom surface 32, the first groove side surface 33, and the second groove side surface 34 in a U shape in a cross-section.

Figure 3:
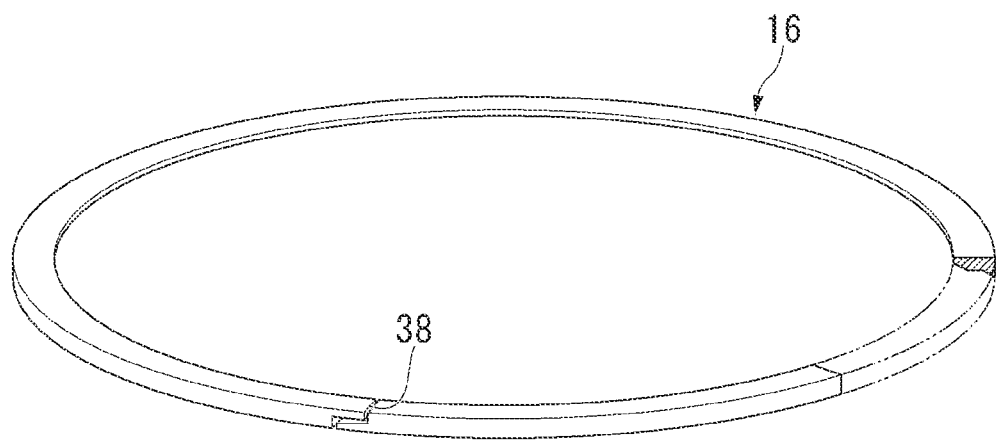
FIG. 3 is a perspective view showing an annular member included in the friction stir welding apparatus of the first embodiment.

As shown in FIG. 1 to FIG. 3, the annular member 16 is fitted to the groove part 31. The groove part 31 is formed such that at least a portion of an inner circumferential end part 35 of the annular member 16 enters the groove part 31. Accordingly, a protrusion section (outside part) 48 of the annular member 16 protrudes to the outside in the radial direction from the groove part 31 and is arranged in a gap S between the probe 26 and the shoulder 18. The protrusion section 48 includes an outer circumferential end part 36. The gap S between the probe 26 and the shoulder 18 is blocked by the protrusion section 48 of the annular member 16.

The annular member 16 is formed in a ring shape and is divided in the radial direction, and thereby, a slit (split part) 38 is formed. The slit 38 is formed, for example, in a crank shape in a side view. The first embodiment is described using an example in which the slit 38 is formed in a crank shape; however, the slit 38 may be formed in another shape such as a straight line. The first embodiment is described using an example in which one slit 38 is formed on the annular member 16; however, a plurality of slits 38 may be formed on the annular member 16.

The annular member 16 is formed of, for example, steel, stainless steel, aluminum alloy, copper alloy, nickel alloy, tungsten alloy, cobalt alloy, titanium alloy, carbide alloy, ceramic, heat resistant resin, or the like.

Specifically, the annular member 16 includes a first annular surface 41, a second annular surface 42, an annular inner circumferential surface 43, an annular outer circumferential surface 44, an inner taper portion 45, and an outer taper portion 46.

The first annular surface 41 is formed on an opposite side (the first groove side surface 33 side) of the joint part 23 in the axis direction and is formed in a ring shape toward an outside in the radial direction from the annular inner circumferential surface 43 to the annular outer circumferential surface 44. The second annular surface 42 is formed on the joint part 23 side (the second groove side surface 34 side) in the axis direction and is formed in a ring shape toward an outside in the radial direction from the inner taper portion 45 to the outer taper portion 46.

The annular inner circumferential surface 43 connects an inner circumference of the first annular surface 41 to an inner circumference of the inner taper portion 45 in the axis direction and is formed on a circumference along the groove bottom surface 32, for example, at a predetermined distance on an outside in the radial direction with respect to the groove bottom surface 32. The annular outer circumferential surface 44 connects an outer circumference of the first annular surface 41 to the vicinity of an outer circumference of the outer taper portion 46 in the axis direction. The annular outer circumferential surface 44 is formed on a circumference, for example, at a predetermined distance on an inside in the radial direction with respect to the inner circumferential surface 18*a* (described later) of the shoulder 18.

The inner taper portion 45 is formed on a portion of the inner circumferential end part 35 of the annular member 16 on a side of the joint part 23. Specifically, the inner taper portion 45 is a surface inclined, in the axial direction, from a circumference on the joint part 23 side (a side close to the joint part 23) of the annular inner circumferential surface 43 to an inner circumference of the second annular surface 42 so as to approach the joint part 23 with advancement from the inside to the outside of the radial direction.

In the first embodiment, the whole inner taper portion 45 and the inner circumferential end part 35 are fitted to (housed in) an inside of the groove part 31. The inner taper portion 45 and the inner circumferential end part 35 may be partially fitted to the inside of the groove part 31.

The outer circumferential end part 36 of the annular member 16 includes a protrusion section 37 that protrudes to the joint part 23 side. An outer taper portion 46 is formed on the protrusion section 37. Specifically, the outer taper portion 46 is a surface inclined from an outer circumference of the second annular surface 42 to a circumference on the joint part 23 side (a side close to the joint part 23) of the annular outer circumferential surface 44 in the axial direction so as to approach the joint part 23 with advancement from the inside to the outside of the radial direction.

As shown in FIG. 1, in the probe 26, the outer circumferential surface 26a is surrounded in a circumferential direction by the shoulder 18 at the outside in the radial direction. The shoulder 18 is formed of, for example, steel, stainless steel, aluminum alloy, copper alloy, nickel alloy, tungsten alloy, cobalt alloy, titanium alloy, carbide alloy, ceramic, heat resistant resin, or the like. The probe 26, the shoulder 18, and the annular member 16 may not be the same material.

The shoulder 18 is, for example, a member having a cylindrical shape in which a penetration hole 51 that penetrates in the axis direction is formed. The shoulder 18 has an inner circumferential surface (inner circumference) 18a and a step part 52. The inner circumferential surface 18a is formed on a circumference along the outer circumferential surface 26a of the probe 26 in a circumferential direction at a predetermined interval on an outside in the radial direction with respect to the outer circumferential surface 26a of the probe 26. In other words, the inner circumferential surface 18a is formed so as to surround the probe 26 at the outside on a surface that intersects the rotation axis 28 of the probe 26.

That is, for example, a slight gap S is formed in the radial direction between the outer circumferential surface 26a of the probe 26 and the inner circumferential surface 18a of the shoulder 18. The probe 26 penetrates movably in the axis direction through the penetration hole 51 of the shoulder 18.

The step part 52 projects radially outward from the inner circumferential surface 18a at an end part 18b of the shoulder 18 on the joint part 23 side and is formed in an annular shape so as to be recessed to the opposite side of the joint part 23.

The shoulder 18 is connected to a drive mechanism (not shown) similarly to the shaft part 25. The drive mechanism can move the probe 26 in the axis direction relative to the shoulder 18 in a state where the probe 26 penetrates through the penetration hole 51 of the shoulder 18. The drive mechanism can rotate the probe 26 in a circumferential direction around the rotation axis 28 and rotate the shoulder 18 in accordance with the rotation of the probe 26.

The gap S between the outer circumferential surface 26a of the probe 26 and the inner circumferential surface 18a of the shoulder 18 is set such that the probe 26 can be stably held by the shoulder 18 in a state where the probe 26 is rotated around the rotation axis 28.

Next, an example in which a cutting chip (for example, a burr or the like) that is generated when the friction stir welding is performed by the friction stir welding apparatus 10 of the first embodiment is prevented from entering the gap S between the probe 26 and the shoulder 18 is described with reference to FIG. 1, FIG. 2, and FIG. 4.

As shown in FIG. 1, the joint part 23 is arranged on the support tool 12 in a state where the first workpiece 21 and the second workpiece 22 are laminated. In this state, the joint part 23 is located at a position that corresponds to the probe 26 and the shoulder 18. An end part 26b of the probe 26 is arranged to be substantially flush with respect to the end part 18b of the shoulder 18.

Next, the drive mechanism is operated, the probe 26 and the shoulder 18 are lowered, the end part 18b of the shoulder 18 is caused to approach a position of a predetermined distance from the joint part 23, and the probe 26 and the shoulder 18 are rotated in accordance with the rotation axis 28 in the arrow A direction. Next, the probe 26 and shoulder 18 are further moved toward the joint part 23, and, for example, the end part 18b of the shoulder 18 is caused to come into slidable contact with the joint part 23. The joint part 23 is pressed by the end part 18b of the shoulder 18, and the joint part 23 is softened by frictional heat. Subsequently, the end part 26b of the probe 26 is caused to come into slidable contact with the joint part 23 in a state of protruding from the end part 18b of the shoulder 18 to the joint part 23 side and pressing the joint part 23. Frictional heat is generated at the joint part 23 with which the end part 26b of the probe 26 comes into slidable contact. Accordingly, the joint part 23 is softened, and the probe 26 is buried in the joint part 23. Thereby, the second workpiece 22 and the first workpiece 21 are welded by the friction stir welding at the joint part 23 by the friction stir welding apparatus 10.

Here, according to the friction stir welding apparatus 10, as shown in FIG. 1 and FIG. 2, the inner circumferential end part 35 of the annular member 16 is fitted to the groove part 31 of the probe 26. Accordingly, the protrusion section 48 of the annular member 16 protrudes radially outward from the groove part 31 and is arranged in the gap S between the probe 26 and the shoulder 18.

Thereby, it is possible to prevent the cutting chip that is generated when the first workpiece 21 and the second workpiece 22 are welded at the joint part 23 by the friction stir welding from entering the gap S between the probe 26 and the shoulder 18 by the annular member 16. Accordingly, it is possible to improve the quality of the joint part 23 by the friction stir welding between the first workpiece 21 and the second workpiece 22.

Further, by fitting the inner circumferential end part 35 of the annular member 16 to the groove part 31, heat transmitted to the probe 26 at the time of the friction stir welding can be transmitted (escape) to the shoulder 18 via the annular member 16. Thereby, the heat-reducing effect of the probe 26 can be expected.

Figure 4:
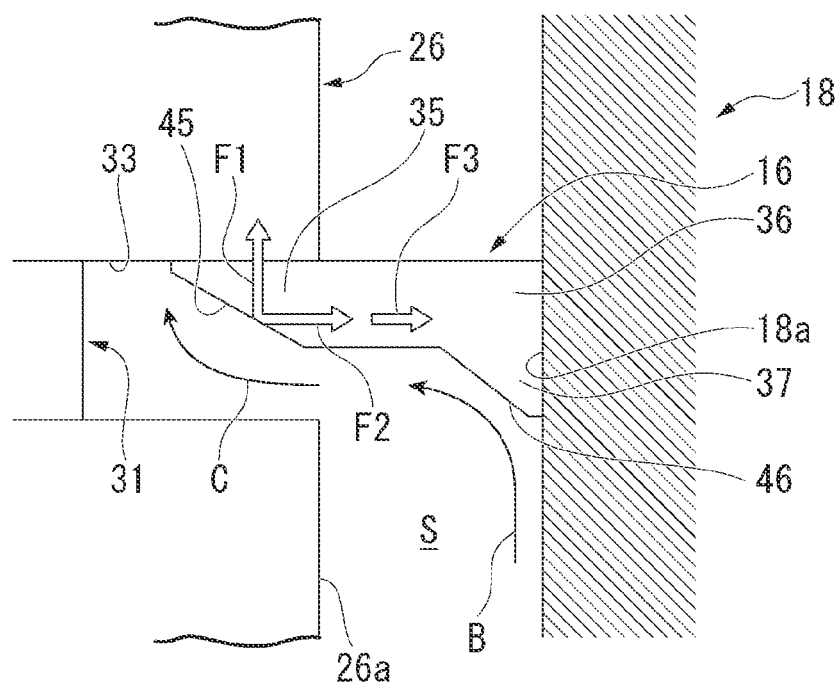
FIG. 4 is a cross-sectional view showing an example of performing a friction stir welding using the friction stir welding apparatus of the first embodiment.

Further, according to the friction stir welding apparatus 10, as shown in FIG. 1 and FIG. 4, the inner taper portion 45 is arranged in a state of entering the groove part 31. The inner taper portion 45 is inclined so as to approach the joint part 23 with advancement from the inside to the outside of the radial direction. Accordingly, the cutting chip that is generated when performing friction stir welding on the joint part 23 can enter the groove part 31 as indicated by an arrow B and an arrow C and cause a pushing force by the cutting chip to act on the inner taper portion 45.

The pushing force by the cutting chip is divided at the inner taper portion 45 into a first component force F1 that pushes the inner circumferential end part 35 of the annular member 16 toward the opposite side of the joint part 23 and a second component force F2 that pushes the inner circumferential end part 35 of the annular member 16 toward the outside in the radial direction.

Accordingly, by the first component force F1, it is possible to cause the inner circumferential end part 35 of the annular member 16 to come into close contact with the first groove side surface 33 (that is, the probe 26) of the groove part 31. By the second component force F2, it is possible to enlarge the diameter of the annular member 16 and cause the outer circumferential end part 36 to come into close contact with the inner circumferential surface 18a of the shoulder 18.

Further, in addition to the second component force F2, a force F3 toward the outside in the radial direction due to a centrifugal force of the cutting chip that has entered the groove part 31 acts on the inner taper portion 45. Accordingly, the contact property to the inner circumferential surface 18a of the shoulder 18 by the outer circumferential end part 36 of the annular member 16 is enhanced. Thereby, the gap S between the probe 26 and the shoulder 18 can be favorably blocked (filled) by the annular member 16, and it is possible to further favorably prevent the cutting chip from entering the gap S by the annular member 16.

Further, by arranging the inner taper portion 45 in a state of entering the groove part 31 and by causing the outer circumferential end part 36 of the annular member 16 to come into close contact with the inner circumferential surface 18a of the shoulder 18, it is possible to cause the annular member 16 to come into close contact with the probe 26 and the shoulder 18. Accordingly, the heat transmitted by the probe at the time of friction stir welding can be efficiently transmitted to the shoulder 18 via the annular member 16. Thereby, it is possible to improve the heat-reducing effect of the probe 26 by the annular member 16.

Additionally, according to the friction stir welding apparatus 10, the inner taper portion 45 is arranged in a state of entering the groove part 31, and the outer taper portion 46 is formed on the protrusion section 37 of the annular member 16.

The outer taper portion 46 is inclined so as to approach the joint part 23 with advancement from the inside to the outside of the radial direction. Accordingly, the cutting chip that is generated when performing friction stir welding on the joint part 23 can be efficiently guided as indicated by an arrow B to the inside (that is, the inner circumferential end part 35 side of the annular member 16) in the radial direction by the outer taper portion 46. Thereby, it is possible to cause a pushing force by the cutting chip to efficiently act on the inner taper portion 45 of the inner circumferential end part 35.

As described above, the pushing force by the cutting chip is divided at the inner taper portion 45 into a first component force F1 that pushes the inner circumferential end part 35 toward the opposite side of the joint part 23 and a second component force F2 that pushes the inner circumferential end part 35 toward the outside in the radial direction.

Accordingly, by the first component force F1, it is possible to cause the inner circumferential end part 35 of the annular member 16 to efficiently come into close contact with the first groove side surface 33 (that is, the probe 26) of the groove part 31. By the second component force F2, it is possible to enlarge the diameter of the annular member 16 and cause the outer circumferential end part 36 to efficiently come into close contact with the inner circumferential surface 18a of the shoulder 18. Thereby, the gap S between the probe 26 and the shoulder 18 can be efficiently blocked (filled) by the annular member 16, and it is possible to further favorably and efficiently prevent the cutting chip from entering the gap S by the annular member 16.

Further, the inner taper portion 45 is arranged in a state of entering the groove part 31, and the outer taper portion 46 is formed on the protrusion section 37 of the annular member 16. Accordingly, by causing the annular member 16 to further efficiently come into close contact with the probe 26 and the shoulder 18, the heat transmitted to the probe 26 at the time of friction stir welding can be further efficiently transmitted to the shoulder 18 via the annular member 16.

Thereby, it is possible to further improve the heat-reducing effect of the probe 26 by the annular member 16.

The first embodiment is described using an example in which the slit 38 is formed on the annular member 16, the diameter of the annular member 16 is enlarged by the second component force F2 that acts on the inner taper portion 45, and the outer circumferential end part 36 is caused to come into close contact with the inner circumferential surface 18a of the shoulder 18; however, the embodiment is not limited thereto. As another example, for example, as a first example, a pressing force by the cutting chip may be caused to act on the inner circumferential surface of the annular member 16, and the outer circumferential end part 36 may be caused to come into close contact with the inner circumferential surface 18a of the shoulder 18. As a second example, the annular member 16 may be expanded by frictional heat, and the outer circumferential end part 36 may be caused to come into close contact with the inner circumferential surface 18a of the shoulder 18. In this case, the slit 38 of the annular member 16 may be eliminated.

As a third example, by pressing the annular member 16 to the first groove side surface 33 of the groove part 31 by the action of the cutting chip and compressing the annular member 16 in the axis direction by the pressing force of the cutting chip, the thickness of the annular member 16 may be reduced. Thereby, by expanding the annular member 16 to the outside in the radial direction, the outer circumferential end part 36 may be caused to come into close contact with the inner circumferential surface 18a of the shoulder 18. In this case, the slit 38 of the annular member 16 may be eliminated. Additionally, a plurality of the first embodiment and the first to third examples may be applied.

Next, a friction stir welding apparatus of second to third embodiments according to the present invention will be described with reference to FIG. 5 to FIG. 9. In the second and third embodiments, the same reference numerals are given to configurations that are the same as or similar to the configuration of the first embodiment, description thereof is omitted, and the differences are described.

Second Embodiment

Figure 5:
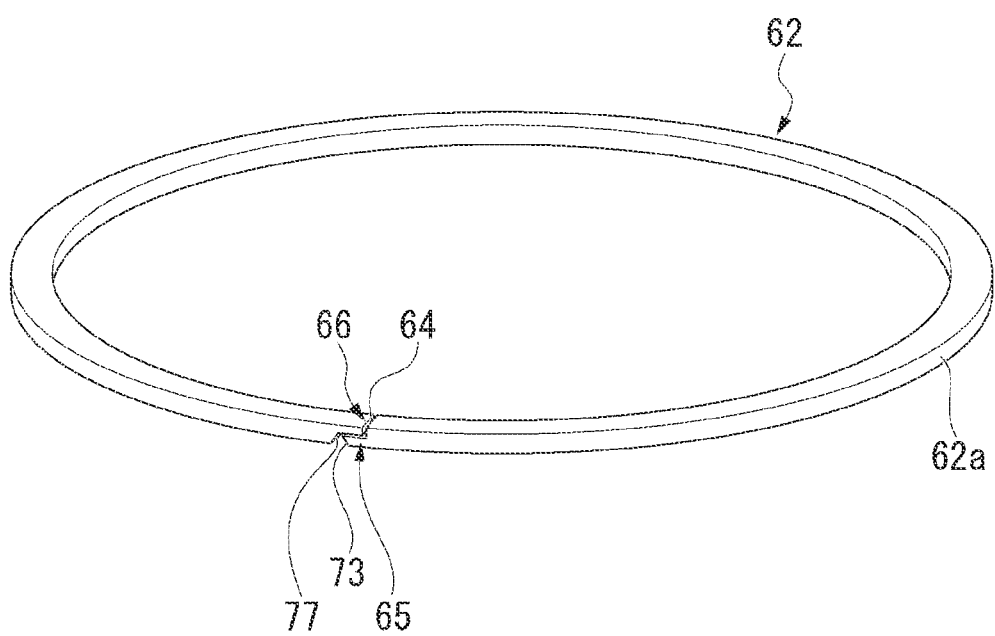
FIG. 5 is a perspective view showing an annular member of a second embodiment according to the present invention.
Figure 6:
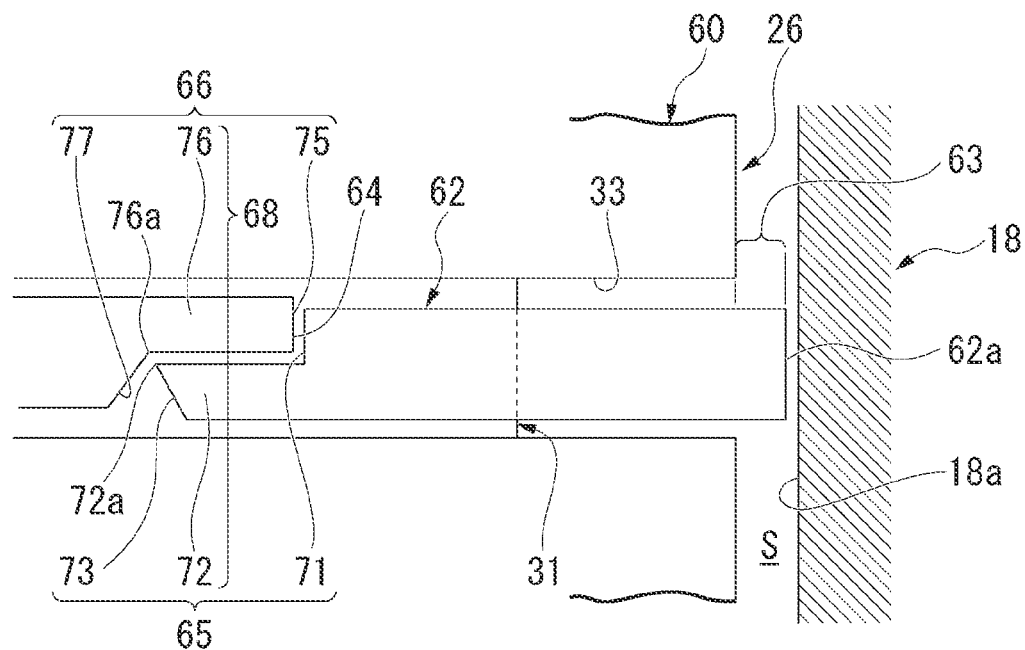
FIG. 6 is a cross-sectional view showing a friction stir welding apparatus that includes the annular member of the second embodiment.

As shown in FIG. 5 and FIG. 6, a friction stir welding apparatus 60 is an apparatus in which the annular member 16 of the first embodiment is replaced by an annular member 62, and the other configurations are similar to those of the friction stir welding apparatus 10 of the first embodiment.

In the friction stir welding apparatus 60, the groove part 31 is formed on the probe 26, and a portion of the annular member 62 is fitted to the groove part 31. Accordingly, a protrusion section (outside part) 63 of the annular member 62 protrudes to the outside in the radial direction from the groove part 31 and is arranged in a gap S between the probe 26 and the shoulder 18.

The annular member 62 is formed in a ring shape and is divided in the radial direction, and thereby, a slit (split part) 64 is formed. The slit 64 is formed, for example, in a substantially crank shape in a side view. The second embodiment is described using an example in which one slit 64 is formed on the annular member 62; however, a plurality of slits 64 may be formed on the annular member 62.

The annular member 62 has a first annular end part 65 and a second annular end part 66 that face each other in the circumferential direction as a pair of end parts by forming the slit 64.

The first annular end part 65 forms one of the pair of end parts and has a first slit surface part 71, a first joint portion 72, and a first enlarged diameter surface part (first surface part) 73.

The first slit surface part 71 is located on the opposite side of the joint part 23 (refer to FIG. 1) in the axis direction in the first annular end part 65 and is arranged along the axis direction at the end part in the circumferential direction. The first joint portion 72 is located closer to the joint part 23 than the first slit surface part 71 in the axis direction in the first annular end part 65 and extends so as to protrude in the circumferential direction from the first slit surface part 71. The first enlarged diameter surface part 73 is formed on an end part in the circumferential direction of the first joint portion 72.

The second annular end part 66 forms another of the pair of end parts and has a second slit surface part 75, a second joint portion 76, and a second enlarged diameter surface part (second surface part) 77.

The second slit surface part 75 is located on the opposite side of the joint part 23 (refer to FIG. 1) in the axis direction in the second annular end part 66 and is arranged along the axis direction so as to face the first slit surface part 71 in the circumferential direction. The second joint portion 76 is located on the opposite side of the joint part 23 in the axis direction and extends so as to protrude in the circumferential direction along the first joint portion 72. The second slit surface part 75 is formed on an end of the second joint portion 76. The second enlarged diameter surface part 77 is formed on the joint part 23 side of the second joint portion 76 in the axis direction and is arranged at a position that faces the first enlarged diameter surface part 73 in the circumferential direction.

The first joint portion 72 and the second joint portion 76 each extend along the circumferential direction and are arranged so as to overlap each other in the axial direction. An overlapping part 68 is formed of the first joint portion 72 and the second joint portion 76.

That is, the first joint portion 72 forms a portion of the overlapping part 68 on the side of the joint part 23 (refer to FIG. 1) in the axis direction and extends in the circumferential direction. The second joint portion 76 forms a portion of the overlapping part 68 on the opposite side of the joint part 23 in the axis direction and extends in the circumferential direction along the first joint portion 72.

The first enlarged diameter surface part 73 is inclined in a taper shape such that the spacing to the second enlarged diameter surface part 77 is enlarged in the circumferential direction with advancement to the joint part 23 from a portion 72a on the opposite side of the joint part 23 at an end in the circumferential direction of the first joint portion 72. The second enlarged diameter surface part 77 is inclined in a taper shape such that the spacing to the first enlarged diameter surface part 73 is enlarged in the circumferential direction with advancement to the joint part 23 from an end 76a of the second joint portion 76 on the side of the joint part 23. That is, the first enlarged diameter surface part 73 and the second enlarged diameter surface part 77 are each inclined so as to form a V shape that is enlarged in the circumferential direction with advancement to the joint part 23.

Next, an example in which the cutting chip that is generated when performing a friction stir welding using the friction stir welding apparatus 60 of the second embodiment is prevented from entering the gap S between the probe 26 and the shoulder 18 is described with reference to FIG. 7.

Figure 7:
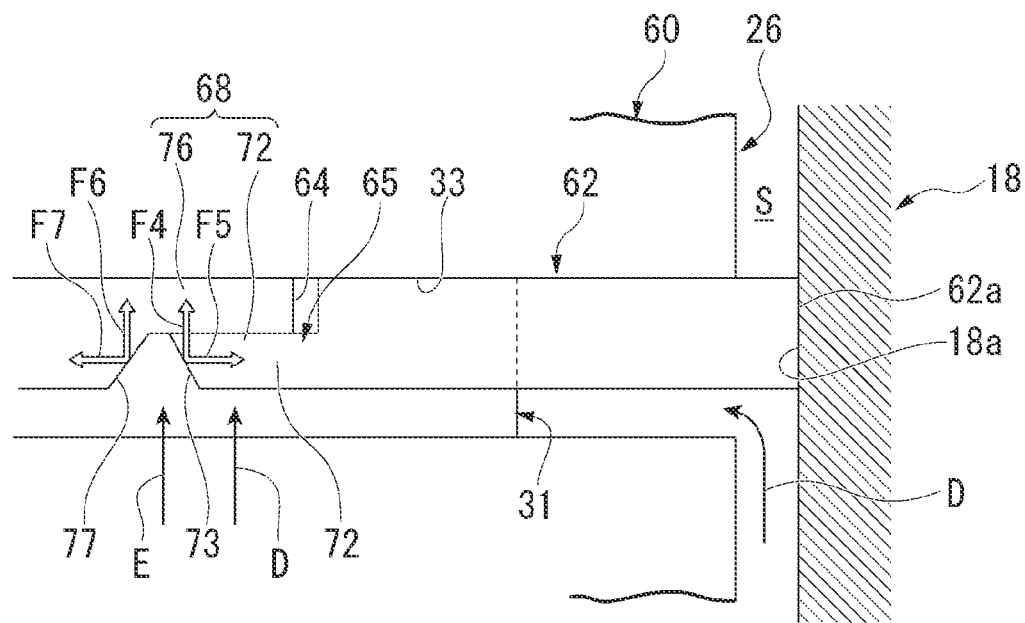
FIG. 7 is a cross-sectional view showing an example of performing a friction stir welding using the friction stir welding apparatus of the second embodiment.

As shown in FIG. 7, according to the friction stir welding apparatus 60, a portion of the annular member 62 is fitted to the groove part 31 of the probe 26, and the protrusion section 63 (refer to FIG. 6) of the annular member 62 is arranged in the gap S between the probe 26 and the shoulder 18.

Accordingly, the cutting chip that is generated at the time of the friction stir welding using the friction stir welding apparatus 60 can enter the first joint portion 72 as indicated by an arrow D and cause a pushing force that pushes toward the opposite side of the joint part 23 to act on the first joint portion 72. Thereby, by pressing the first joint portion 72 to the second joint portion 76, it is possible to tighten the overlapping part 68 in the axis direction. Further, by the pushing force of the cutting chip that acts on the entire circumference of the annular member 62, it is possible to cause the annular member 62 to come into close contact with the first groove side surface 33 (that is, the probe 26) of the recess part 31.

Additionally, the first enlarged diameter surface part 73 and the second enlarged diameter surface part 77 are inclined in a V shape so as to be enlarged in the circumferential direction with advancement to the joint part 23 (refer to FIG. 1). Accordingly, the cutting chip that is generated at the time of the friction stir welding can enter the first enlarged diameter surface part 73 and the second enlarged diameter surface part 77 as indicated by an arrow E and cause a pushing force by the cutting chip to act on the first enlarged diameter surface part 73 and the second enlarged diameter surface part 77.

The pushing force by the cutting chip is divided at the first enlarged diameter surface part 73 into a first component force F4 that pushes toward the opposite side of the joint part 23 and a second component force F5 that pushes so as to enlarge the spacing between the first enlarged diameter surface part 73 and the second enlarged diameter surface part 77.

The pushing force by the cutting chip is divided at the second enlarged diameter surface part 77 into a first component force F6 that pushes toward the opposite side of the joint part 23 and a second component force F7 that pushes so as to enlarge the spacing between the first enlarged diameter surface part 73 and the second enlarged diameter surface part 77.

That is, by the second component forces F5 and F7, it is possible to enlarge the diameter of the annular member 62 and cause the outer circumferential surface 62a of the annular member 62 to come into close contact with the inner circumferential surface 18a of the shoulder 18.

In this way, by the pushing force of the cutting chip, it is possible to tighten the overlapping part 68 and to cause the annular member 62 to come into close contact with the recess part 31 (that is, the probe 26). Additionally, by the second component forces F5 and F7, it is possible to enlarge the diameter of the annular member 62 and cause the outer circumferential surface 62a to come into close contact with the inner circumferential surface 18a of the shoulder 18. Thereby, the gap S between the probe 26 and the shoulder 18 can be blocked (filled) by the annular member 62, and it is possible to prevent the cutting chip from entering the gap S by the annular member 62.

By inclining the first enlarged diameter surface part 73, it is possible to push the first enlarged diameter surface part 73 by the first component force F4 toward the opposite side of the joint part 23 (refer to FIG. 1). Accordingly, the first joint portion 72 can be pressed to the second joint portion 76 by the first component force F4, and it is possible to further reliably tighten the overlapping part 68.

Further, by inclining the first enlarged diameter surface part 73 and the second enlarged diameter surface part 77, it is possible to push the first enlarged diameter surface part 73 by the first component force F4 toward the opposite side of the joint part 23, and it is possible to push the second enlarged diameter surface part 77 by the first component force F6 toward the opposite side of the joint part 23. Accordingly, it is possible to cause the vicinity of the slit 64 of the annular member 62 to come into close contact with the first groove side surface 33 (that is, the probe 26) of the groove part 31.

Thereby, it is possible to further reliably prevent the cutting chip from entering the gap S between the probe 26 and the shoulder 18 by the annular member 62.

Further, by causing the annular member 62 to come into close contact with the probe 26 and the shoulder 18, it is possible to efficiently transmit the heat of the probe 26 to the shoulder 18 via the annular member 62 at the time of friction stir welding. Thereby, it is possible to improve the heat-reducing effect of the probe 26 by the annular member 62.

The second embodiment is described using an example in which both of the first enlarged diameter surface part 73 and the second enlarged diameter surface part 77 are inclined in a taper shape; however, the embodiment is not limited thereto. As another example, any one of the first enlarged diameter surface part 73 and the second enlarged diameter surface part 77 may be inclined in a taper shape.

The shape of the annular member 16 of the first embodiment may be combined with the shape of the annular member 62 of the second embodiment. That is, the inner taper portion 45 (refer to FIG. 2) and the outer taper portion 46 (refer to FIG. 2) of the annular member 16 of the first embodiment may be added to the shape of the annular member 62 of the second embodiment.

Thereby, it is possible to further reliably and efficiently prevent the cutting chip from entering the gap S between the probe 26 and the shoulder 18 by the annular member 62.

Further, it is possible to further reliably and efficiently transmit the heat of the probe 26 to the shoulder 18 via the annular member 62 at the time of friction stir welding, and it is possible to further improve the heat-reducing effect of the probe 26.

Third Embodiment

Figure 8:
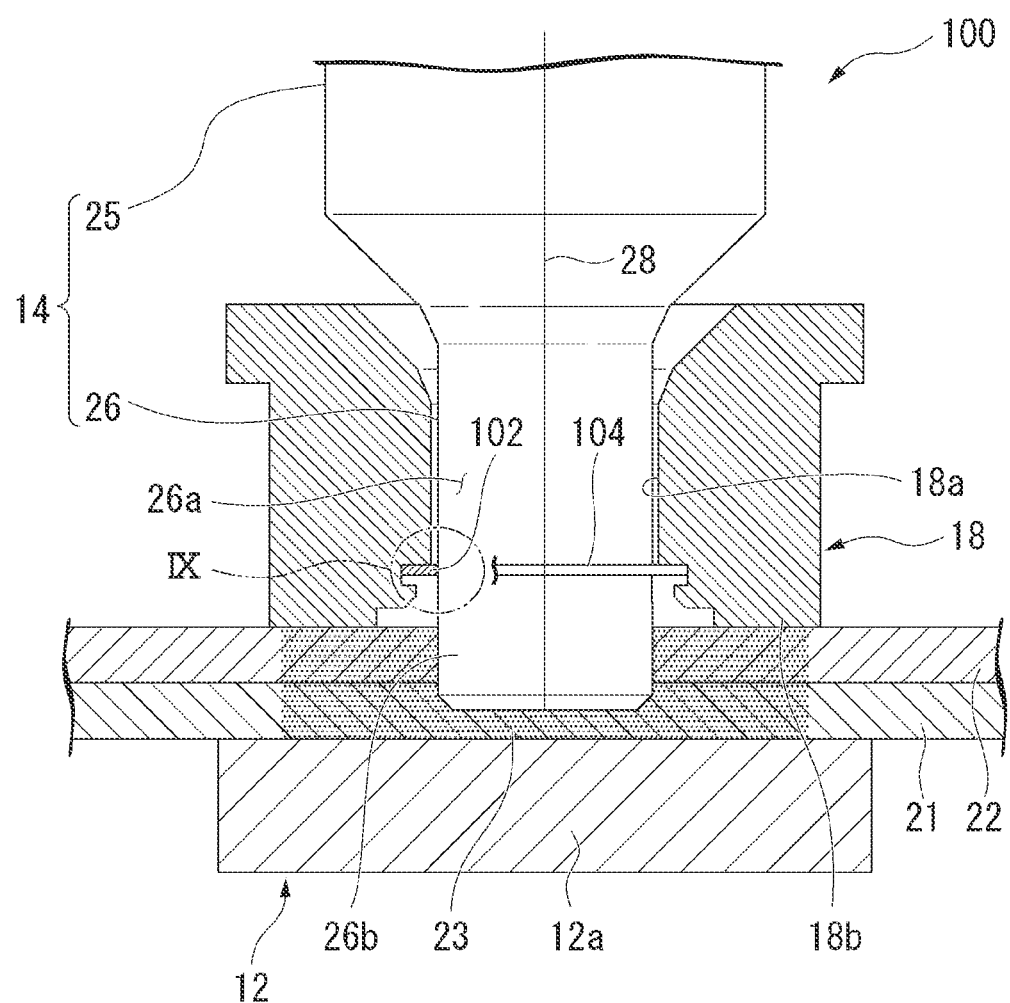
FIG. 8 is a cross-sectional view showing a friction stir welding apparatus of a third embodiment according to the present invention.
Figure 9:
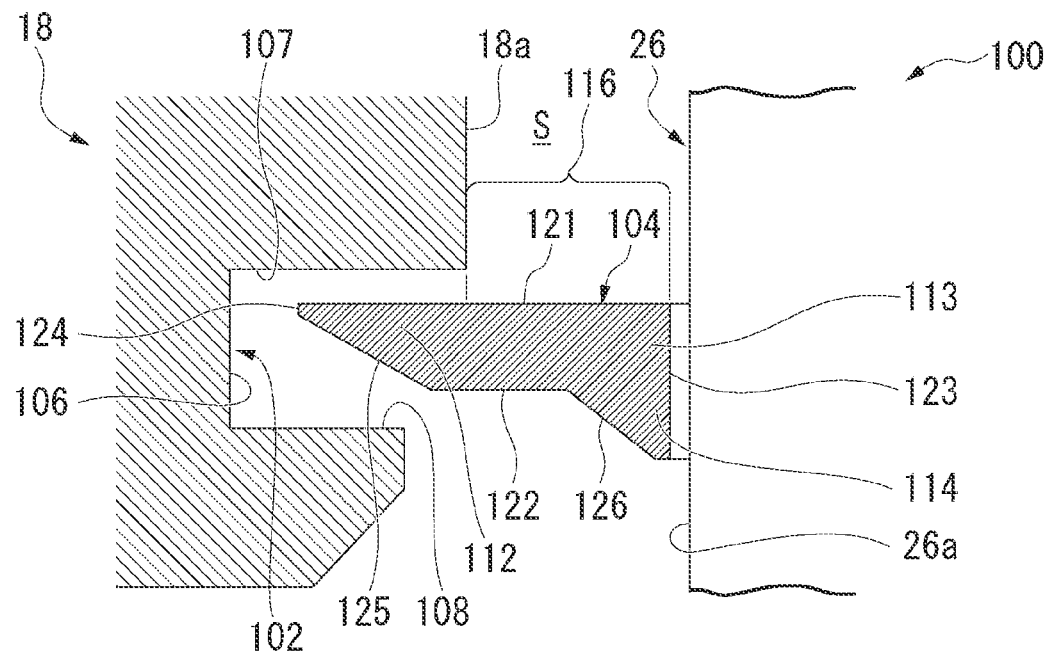
FIG. 9 is an enlarged cross-sectional view of a portion IX of FIG. 8.

As shown in FIG. 8 and FIG. 9, a friction stir welding apparatus 100 is an apparatus in which a groove part (recess part) 102 is formed on the inner circumferential surface 18a of the shoulder 18 and an annular member 104 is fitted to the groove part 102, and other configurations are similar to those of the friction stir welding apparatus 10 of the first embodiment.

The groove part 102 is formed in a recess part having an annular shape along the circumferential direction of the inner circumferential surface 18a in the vicinity of the end part 18b of the inner circumferential surface 18a of the shoulder 18. The groove part 102 may be formed at an arbitrary position in the axis direction of the inner circumferential surface 18a of the shoulder 18. Specifically, the groove part 102 includes a groove bottom surface 106, a first groove side surface 107, and a second groove side surface 108.

The groove bottom surface 106 is formed on a circumference along the inner circumferential surface 18a at a predetermined distance on an outside in a radial direction with respect to the inner circumferential surface 18a of the shoulder 18. The first groove side surface 107 is formed in a ring shape toward an inside in the radial direction to the inner circumferential surface 18a from the periphery of an opposite side (a side away from the joint part 23) of the joint part 23 (that is, the first workpiece 21, the second workpiece 22) in the axis direction of the groove bottom surface 106. The second groove side surface 108 is formed in a ring shape toward an inside in the radial direction to the inner circumferential surface 18a from the periphery of the joint part 23 side (a side close to the joint part 23) in the axis direction of the groove bottom surface 106.

The first groove side surface 107 and the second groove side surface 108 are formed to face each other at a predetermined interval in the axis direction. That is, the groove part 102 is formed of the groove bottom surface 106, the first groove side surface 107, and the second groove side surface 108 in a U shape in a cross-section.

The annular member 104 is fitted to the groove part 102. The groove part 102 is formed such that at least a portion of an inner circumferential end part 112 of the annular member 104 enters the groove part 102. Accordingly, a protrusion section (inside part) 116 of the annular member 104 protrudes to the inside in the radial direction from the groove part 102 and is arranged in a gap S between the outer circumferential surface 26a of the probe 26 and the inner circumferential surface 18a of the shoulder 18. The protrusion section 116 includes an inner circumferential end part 113. The gap S between the probe 26 and the shoulder 18 is blocked by the protrusion section 116 of the annular member 104.

The annular member 104 includes a first annular surface 121, a second annular surface 122, an annular inner circumferential surface 123, an annular outer circumferential surface 124, an outer taper portion 125, and an inner taper portion 126.

The first annular surface 121 is formed on an opposite side (the first groove side surface 107 side) of the joint part 23 in the axis direction and is formed in a ring shape toward an outside in the radial direction from the annular inner circumferential surface 123 to the annular outer circumferential surface 124. The second annular surface 122 is formed on the joint part 23 side (the second groove side surface 108 side) in the axis direction and is formed in a ring shape toward an outside in the radial direction from the inner taper portion 126 to the outer taper portion 125.

The annular inner circumferential surface 123 connects an inner circumference of the first annular surface 121 to the vicinity of an inner circumference of the inner taper portion 126 in the axis direction. The annular inner circumferential surface 123 is formed, for example, on a circumference at a predetermined distance on an outside in the radial direction with respect to the outer circumferential surface 26a of the probe 26. The annular outer circumferential surface 124 connects an outer circumference of the first annular surface 121 to an outer circumference of the outer taper portion 125 in the axis direction. The annular outer circumferential surface 124 is formed, for example, on a circumference along the groove bottom surface 106 at a predetermined distance on an inside in the radial direction with respect to the groove bottom surface 106.

The outer taper portion 125 is formed on a portion of the outer circumferential end part 112 of the annular member 104 on a side of the joint part 23. Specifically, the outer taper portion 125 is a surface inclined, in the axial direction, from a circumference on the joint part 23 side (a side close to the joint part 23) of the annular outer circumferential surface 124 to an outer circumference of the second annular surface 122 so as to approach the joint part 23 with advancement from the outside to the inside of the radial direction.

In the third embodiment, the whole outer taper portion 125 and the outer circumferential end part 112 are fitted to (housed in) an inside of the groove part 102. The outer taper portion 125 and the outer circumferential end part 112 may be partially fitted to the inside of the groove part 102.

The inner circumferential end part 113 of the annular member 104 includes a protrusion section 114 that protrudes to the joint part 23 side.

An inner taper portion 126 is formed on the protrusion section 114. Specifically, the inner taper portion 126 is a surface inclined from an inner circumference of the second annular surface 122 to a circumference on the joint part 23 side (a side close to the joint part 23) of the annular inner circumferential surface 123 in the axial direction so as to approach the joint part 23 with advancement from the outside to the inside of the radial direction.

Next, an example in which a cutting chip that is generated when the friction stir welding is performed by the friction stir welding apparatus 100 of the third embodiment is prevented from entering the gap S between the probe 26 and the shoulder 18 is described with reference to FIG. 8 to FIG. 10.

According to the friction stir welding apparatus 100, as shown in FIG. 8 and FIG. 9, the outer circumferential end part 112 of the annular member 104 is fitted to a groove part 102 of the inner circumferential surface 18*a* of the shoulder 18. Accordingly, the protrusion section 116 of the annular member 104 protrudes radially inward from the groove part 102 and is arranged in the gap S between the probe 26 and the shoulder 18.

Thereby, it is possible to prevent the cutting chip that is generated when the first workpiece 21 and the second workpiece 22 are welded at the joint part 23 by the friction stir welding from entering the gap S between the probe 26 and the shoulder 18 by the annular member 104. Accordingly, it is possible to improve the quality by the friction stir welding of the joint part 23 between the first workpiece 21 and the second workpiece 22.

Further, by fitting the outer circumferential end part 112 of the annular member 104 to the groove part 102, heat transmitted to the probe 26 at the time of the friction stir welding can be transmitted (escape) to the shoulder 18 via the annular member 104. Thereby, the heat-reducing effect of the probe 26 can be expected.

Figure 10:
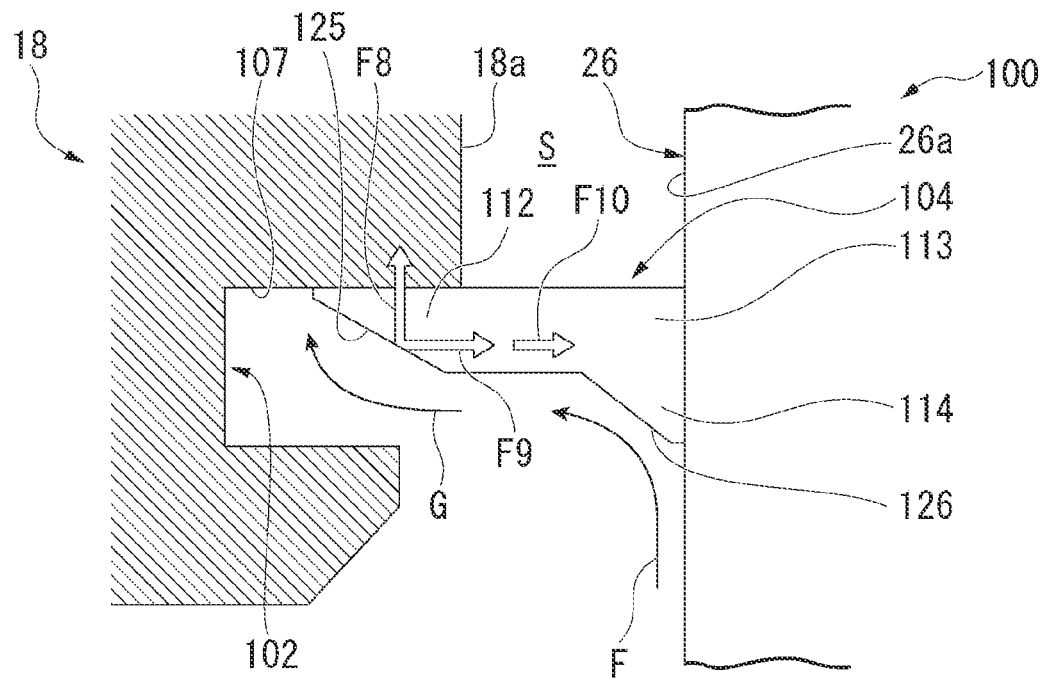
FIG. 10 is a cross-sectional view showing an example of performing a friction stir welding using the friction stir welding apparatus of the third embodiment.

Further, according to the friction stir welding apparatus 100, as shown in FIG. 8 and FIG. 10, the outer taper portion 125 is arranged in a state of entering the groove part 102. The outer taper portion 125 is inclined so as to approach the joint part 23 with advancement from the outside to the inside of the radial direction. Accordingly, the cutting chip that is generated when performing friction stir welding on the joint part 23 can enter the groove part 102 as indicated by an arrow F and an arrow G and cause a pushing force by the cutting chip to act on the outer taper portion 125.

The pushing force by the cutting chip is divided at the outer taper portion 125 into a first component force F8 that pushes the outer circumferential end part 112 of the annular member 104 toward the opposite side of the joint part 23 and a second component force F9 that pushes the outer circumferential end part 112 of the annular member 16 toward the inside in the radial direction.

Accordingly, by the first component force F8, it is possible to cause the outer circumferential end part 112 of the annular member 104 to come into close contact with the first groove side surface 107 (that is, the shoulder 18) of the groove part 102. By the second component force F9, it is possible to reduce the diameter of the annular member 104 and cause the inner circumferential end part 113 to come into close contact with the outer circumferential surface 26*a* of the probe 26.

Further, in addition to the second component force F9, a force F10 toward the inside in the radial direction due to a centrifugal force of the cutting chip that has entered the groove part 102 acts on the outer taper portion 125. Accordingly, the contact property to the outer circumferential surface 26*a* of the probe 26 by the inner circumferential end part 113 of the annular member 104 is enhanced. Thereby, the gap S between the probe 26 and the shoulder 18 can be favorably blocked (filled) by the annular member 16, and it is possible to further favorably prevent the cutting chip from entering the gap S by the annular member 104.

Further, by arranging the outer taper portion 125 in a state of entering the groove part 102 and by causing the inner circumferential end part 113 of the annular member 104 to come into close contact with the outer circumferential surface 26*a* of the probe 26, it is possible to cause the annular member 104 to come into close contact with the probe 26 and the shoulder 18. Accordingly, the heat transmitted by the probe at the time of friction stir welding can be efficiently transmitted to the shoulder 18 via the annular member 104. Thereby, it is possible to improve the heat-reducing effect of the probe 26 by the annular member 104.

Additionally, according to the friction stir welding apparatus 100, the outer taper portion 125 is arranged in a state of entering the groove part 102, and the inner taper portion 126 is formed on the protrusion section 114 of the annular member 104. The inner taper portion 126 is inclined so as to approach the joint part 23 with advancement from the outside to the inside of the radial direction. Accordingly, the cutting chip that is generated when performing friction stir welding on the joint part 23 can be efficiently guided as indicated by an arrow F to the outside (that is, the outer circumferential end part 112 side of the annular member 104) in the radial direction by the inner taper portion 126. Thereby, it is possible to cause a pushing force by the cutting chip to efficiently act on the outer taper portion 125 of the outer circumferential end part 112.

As described above, the pushing force by the cutting chip is divided at the outer taper portion 125 into a first component force F8 that pushes the outer circumferential end part 112 toward the opposite side of the joint part 23 and a second component force F9 that pushes the outer circumferential end part 112 toward the inside in the radial direction.

Accordingly, by the first component force F8, it is possible to cause the outer circumferential end part 112 of the annular member 104 to efficiently come into close contact with the first groove side surface 107 (that is, the shoulder 18) of the groove part 102. By the second component force F9, it is possible to reduce the diameter of the annular member 104 and cause the inner circumferential end part 113 to efficiently come into close contact with the outer circumferential surface 26a of the probe 26. Thereby, the gap S between the probe 26 and the shoulder 18 can be efficiently blocked (filled) by the annular member 104, and it is possible to further favorably and efficiently prevent the cutting chip from entering the gap S by the annular member 104.

Further, the outer taper portion 125 is arranged in a state of entering the groove part 102, and the inner taper portion 126 is formed on the protrusion section 114 of the annular member 104. Accordingly, by causing the annular member 104 to further efficiently come into close contact with the probe 26 and the shoulder 18, the heat transmitted to the probe 26 at the time of friction stir welding can be further efficiently transmitted to the shoulder 18 via the annular member 104. Thereby, it is possible to further improve the heat-reducing effect of the probe 26 by the annular member 104.

The third embodiment is described using an example in which a slit is formed on the annular member 104, the diameter of the annular member 104 is reduced by the second component force F9 that acts on the outer taper portion 125, and the inner circumferential end part 113 is caused to come into close contact with the outer circumferential surface 26a of the probe 26; however, the embodiment is not limited thereto. As another example, for example, as a first example, a pressing force by the cutting chip may be caused to act on the outer circumferential surface of the annular member 104, and the inner circumferential end part 113 may be caused to come into close contact with the outer circumferential surface 26a of the probe 26. As a second example, the annular member 16 may be expanded by frictional heat to the inside in the radial direction, and the outer circumferential end part 36 may be caused to come into close contact with the outer circumferential surface 26a of the probe 26. In this case, the slit of the annular member 104 may be eliminated.

Further, as a third example, by pressing the annular member 104 to the first groove side surface 107 of the groove part 102 by the action of the cutting chip and compressing the annular member 104 in the axis direction by the pressing force of the cutting chip, the thickness of the annular member 16 may be reduced. Thereby, by expanding the annular member 104 to the inside in the radial direction, the inner circumferential end part 113 may be caused to come into close contact with the outer circumferential surface 26a of the probe 26. In this case, the slit of the annular member 104 may be eliminated. Additionally, a plurality of the third embodiment and the first to third examples may be applied.

Fourth Embodiment

As shown in FIG. 11, a friction stir welding apparatus 140 is an apparatus in which a groove part 102 is formed on the inner circumferential surface 18a of the shoulder 18 and an annular member 142 is fitted to the groove part 102, and other configurations are similar to those of the friction stir welding apparatus 60 of the second embodiment.

The annular member 142 is formed such that, by being fitted to the groove part 102 of the shoulder 18, at least a portion of an outer circumferential end part 143 enters the groove part 102. Accordingly, a protrusion section (inside part) 144 of the annular member 142 protrudes to the inside in the radial direction from the groove part 102 and is arranged in a gap S between the outer circumferential surface 26a of the probe 26 and the inner circumferential surface 18a of the shoulder 18. The protrusion section 144 includes an inner circumferential end part 145. The gap S between the probe 26 and the shoulder 18 is blocked by the protrusion section 144 of the annular member 142.

The annular member 142 is formed in a ring shape and is divided in the radial direction, and thereby, a slit (split part) 146 is formed. The slit 146 is formed, for example, in a substantially crank shape in a side view. The fourth embodiment is described using an example in which one slit 146 is formed on the annular member 142; however, a plurality of slits 146 may be formed on the annular member 142.

The annular member 142 has a first annular end part 151 and a second annular end part 152 that face each other in the circumferential direction as a pair of end parts by forming the slit 146.

The first annular end part 151 forms one of the pair of end parts and has a first joint portion 154 and a first enlarged diameter recess part 155.

The first joint portion 154 is located on the side of the joint part 23 (refer to FIG. 1) in the axis direction in the first annular end part 151 and extends so as to protrude in the circumferential direction. The first enlarged diameter recess part 155 is located on the opposite side of the first joint portion 154 with respect to a base end 154a of the first joint portion 154 in the circumferential direction and is formed in a recess shape so as to be recessed to the opposite side from the side of the joint part 23 in the axis direction.

The first enlarged diameter recess part 155 has a first enlarged diameter surface part (first surface part) 156 on the side of the first joint portion 154 in the circumferential direction. The first enlarged diameter surface part 156 is formed in a taper shape so as to approach the joint part 23 with advancement to the first joint portion 154 in the circumferential direction.

The second annular end part 152 forms another of the pair of end parts and has a second joint portion 158 and a second enlarged diameter recess part 159.

The second joint portion 158 is located on the opposite side of the joint part 23 in the axis direction and extends so as to protrude in the circumferential direction along the first joint portion 154. The second enlarged diameter recess part 159 is located on the opposite side of the second joint portion 158 with respect to a base end 158a of the second joint portion 158 in the circumferential direction and is formed in a recess shape so as to be recessed to the opposite side from the side of the joint part 23 in the axis direction.

The second enlarged diameter recess part 159 has a second enlarged diameter surface part (second surface part) 161 on the side of the second joint portion 158 in the circumferential direction. The second enlarged diameter surface part 161 is formed in a taper shape so as to approach the joint part 23 with advancement to the second joint portion 158 in the circumferential direction.

The first joint portion 154 and the second joint portion 158 each extend along the circumferential direction and are arranged so as to overlap each other in the axial direction. An overlapping part 153 is formed of the first joint portion 154 and the second joint portion 158.

That is, the first joint portion 154 forms a portion of the overlapping part 153 on the side of the joint part 23 (refer to FIG. 1) in the axis direction and extends in the circumferential direction. The second joint portion 158 forms a portion of the overlapping part 153 on the opposite side of the joint part 23 in the axis direction and extends in the circumferential direction along the first joint portion 154.

The first enlarged diameter surface part 156 and the second enlarged diameter surface part 161 are inclined such that the spacing is narrowed in the circumferential direction with advancement to the first joint portion 154.

Next, an example in which the cutting chip that is generated when performing a friction stir welding using the friction stir welding apparatus 140 of the fourth embodiment is prevented from entering the gap S between the probe 26 and the shoulder 18 is described with reference to FIG. 12.

As shown in FIG. 12, the cutting chip that is generated at the time of the friction stir welding enters the first joint portion 154 as indicated by an arrow H and causes a pushing force that pushes toward the opposite side of the joint part 23 to act on the first joint portion 154. Thereby, by pressing the first joint portion 154 to the second joint portion 158, it is possible to tighten the overlapping part 153 in the axis direction. Further, by the pushing force of the cutting chip that acts on the entire circumference of the annular member 142, it is possible to cause the annular member 142 to come into close contact with the first groove side surface 107 (that is, the shoulder 18) of the recess part 102.

Additionally, the cutting chip that is generated at the time of the friction stir welding can enter the first enlarged diameter surface part 156 and the second enlarged diameter surface part 161 as indicated by an arrow I and cause a pushing force by the cutting chip to act on the first enlarged diameter surface part 156 and the second enlarged diameter surface part 161. The pushing force by the cutting chip is divided at the first enlarged diameter surface part 156 and the second enlarged diameter surface part 161 into a first component force F11 that pushes toward the opposite side of the joint part 23 and a second component force F12 that pushes so as to narrow the spacing between the first enlarged diameter surface part 156 and the second enlarged diameter surface part 161.

That is, by the second component force F12, it is possible to reduce the diameter of the annular member 142 and cause the inner circumferential end part 145 (specifically, an inner circumferential surface 145*a* of the inner circumferential end part 145) of the annular member 142 to come into close contact with the outer circumferential surface 26*a* of the probe 26. Thereby, the gap S between the probe 26 and the shoulder 18 can be blocked (filled) by the annular member 142, and it is possible to prevent the cutting chip from entering the gap S by the annular member 62.

Here, it is possible to push the first enlarged diameter surface part 156 by the first component force F11 toward the opposite side of the joint part 23 (refer to FIG. 1). Accordingly, the first joint portion 154 can be pressed to the second joint portion 158 by the first component force F11, and it is possible to further reliably tighten the overlapping part 153.

Further, it is possible to push the first enlarged diameter surface part 156 and the second enlarged diameter surface part 161 by the first component force F11 toward the opposite side of the joint part 23. Accordingly, it is possible to cause the vicinity of the slit 146 of the annular member 142 to come into close contact with the first groove side surface 107 (that is, the shoulder 18) of the groove part 102.

Thereby, it is possible to further reliably prevent the cutting chip from entering the gap S between the probe 26 and the shoulder 18 by the annular member 142.

Further, by causing the annular member 142 to come into close contact with the probe 26 and the shoulder 18, it is possible to efficiently transmit the heat of the probe 26 to the shoulder 18 via the annular member 142 at the time of friction stir welding. Thereby, it is possible to improve the heat-reducing effect of the probe 26 by the annular member 62.

The fourth embodiment is described using an example in which both of the first enlarged diameter surface part 156 and the second enlarged diameter surface part 161 are inclined in a taper shape; however, the embodiment is not limited thereto. As another example, any one of the first enlarged diameter surface part 156 and the second enlarged diameter surface part 161 may be inclined in a taper shape.

The shape of the annular member 104 of the third embodiment may be combined with the shape of the annular member 142 of the fourth embodiment. That is, the outer taper portion 125 (refer to FIG. 9) and the inner taper portion 126 (refer to FIG. 9) of the annular member 104 of the third embodiment may be added to the shape of the annular member 142 of the fourth embodiment. Thereby, it is possible to further reliably and efficiently prevent the cutting chip from entering the gap S between the probe 26 and the shoulder 18 by the annular member 62.

Further, it is possible to further reliably and efficiently transmit the heat of the probe 26 to the shoulder 18 via the annular member 142 at the time of friction stir welding, and it is possible to further improve the heat-reducing effect of the probe 26.

The technical scope of the present invention is not limited to the embodiments described above, and various changes can be added without departing from the scope of the present invention.

For example, the embodiments are described using examples in which the annular member 16 is fitted to the groove part 31 of the probe 26 in the friction stir welding apparatus 10 of the first embodiment, and the annular member 104 is fitted to the groove part 102 of the shoulder 18 in the friction stir welding apparatus 100 of the third embodiment; however, the embodiment is not limited thereto. As another example, a groove part may be formed on both the probe 26 and the shoulder 18, and the annular member may be fit to each groove part.

In this case, the annular member that is fitted to the groove part of the probe 26 may be arranged on the side of the joint part 23 with respect to the annular member that is fitted to the groove part of the shoulder 18. Alternatively, the annular member that is fitted to the groove part of the shoulder 18 may be arranged on the side of the joint part 23 with respect to the annular member that is fitted to the groove part of the probe 26. By arranging the annular member that is fitted to the groove part of the shoulder 18 on the side of the joint part 23, the annular member that is fitted to the groove part of the shoulder 18 can be closer to the side of the end part 26*b* of the probe 26, and it is possible to prevent the cutting chip from entering at the side of the end part (front end part) 26*b* of the probe 26.

Further, the second embodiment and the fourth embodiment may be combined in the same manner as the configuration that combines the first embodiment and the third embodiment described above.

The configuration element in the embodiments described above can be replaced by a known configuration element without departing from the scope of the present invention, and the modification examples described above may be suitably combined.

What is claimed is:
1. A friction stir welding apparatus, comprising:
 a probe that is pressed to a joint part of a plurality of joined members while being rotated;
 a shoulder that surrounds the probe at an outside in a radial direction with respect to a rotation axis of the probe;

a recess part that is formed in an annular shape along a circumferential direction of the rotation axis on at least one of an outer circumference of the probe and an inner circumference of the shoulder; and an annular member that is fitted to the recess part, wherein the annular member is formed on a circumference along a groove bottom surface of the recess part, an outer circumferential end part of the annular member is capable of coming into contact with an inner circumferential surface of the shoulder, the recess part is formed on the probe such that at least a portion of an inner circumferential end part of the annular member enters the recess part, and the inner circumferential end part has an inner taper portion inclined so as to approach the joint part with advancement from an inside to an outside of the radial direction.

2. A friction stir welding apparatus, comprising:

a probe that is pressed to a joint part of a plurality of joined members while being rotated;

a shoulder that surrounds the probe at an outside in a radial direction with respect to a rotation axis of the probe;

a recess part that is formed in an annular shape along a circumferential direction of the rotation axis on at least one of an outer circumference of the probe and an inner circumference of the shoulder; and an annular member that is fitted to the recess part, wherein the annular member is formed on a circumference along a groove bottom surface of the recess part, an outer circumferential end part of the annular member is capable of coming into contact with an inner circumferential surface of the shoulder, the recess part is formed on the probe such that at least a portion of an inner circumferential end part of the annular member enters the recess part, an outer circumferential end part of the annular member has a protrusion section that protrudes toward the joint part, and the protrusion section has an outer taper portion inclined so as to approach the joint part with advancement from an inside to an outside of the radial direction.

3. A friction stir welding apparatus, comprising:

a probe that is pressed to a joint part of a plurality of joined members while being rotated;

a shoulder that surrounds the probe at an outside in a radial direction with respect to a rotation axis of the probe;

a recess part that is formed in an annular shape along a circumferential direction of the rotation axis on at least one of an outer circumference of the probe and an inner circumference of the shoulder; and an annular member that is fitted to the recess part, wherein the annular member is formed on a circumference along a groove bottom surface of the recess part, an outer circumferential end part of the annular member is capable of coming into contact with an inner circumferential surface of the shoulder, the recess part is formed on the probe, the annular member has a pair of end parts that face each other in a circumferential direction of the rotation axis, the pair of end parts has an overlapping part that extends along the circumferential direction and that overlaps in an axis direction of the rotation axis, one of the pair of end parts has: a first joint portion that forms a portion of the overlapping part on a side of the joint part in the axis direction; and a first surface portion that is formed on an end in the circumferential direction of the first joint portion, another of the pair of end parts has: a second joint portion that forms a portion of the overlapping part on an opposite side of the joint part in the axis direction; and a second surface portion that faces the first surface portion in the circumferential direction, and at least one of the first surface portion and the second surface portion is inclined such that a spacing between the surface portions is enlarged in the circumferential direction with advancement to the joint part.

4. The friction stir welding apparatus according to claim 1, wherein the recess part is formed on the shoulder such that at least a portion of an outer circumferential end part of the annular member enters the recess part, and the outer circumferential end part has an outer taper portion inclined toward the joint part with advancement from an outside to an inside of the radial direction.

5. The friction stir welding apparatus according to claim 1, wherein the recess part is formed on the shoulder such that at least a portion of an outer circumferential end part of the annular member enters the recess part, an inner circumferential end part of the annular member has a protrusion section that protrudes toward the joint part, and the protrusion section has an inner taper portion inclined toward the joint part with advancement from an outside to an inside of the radial direction.

* * * * *